April 23, 1968     S. W. ALDERFER     3,379,236
MOLDED TIRES Filed Aug. 3, 1965     8 Sheets-Sheet 1

INVENTOR.
STERLING W. ALDERFER
BY *Hamilton & Cook*

ATTORNEYS

INVENTOR.
STERLING W. ALDERFER
BY Hamilton & Cook
ATTORNEYS

April 23, 1968     S. W. ALDERFER     3,379,236
MOLDED TIRES
Filed Aug. 3, 1965     8 Sheets-Sheet 3

INVENTOR.
STERLING W. ALDERFER
BY *Hamilton & Cook*
ATTORNEYS

INVENTOR.
STERLING W. ALDERFER
BY Hamilton & Cook
ATTORNEYS

April 23, 1968 S. W. ALDERFER 3,379,236
MOLDED TIRES

Filed Aug. 3, 1965 8 Sheets-Sheet 6

INVENTOR.
STERLING W. ALDERFER
BY Hamilton & Cook
ATTORNEYS

April 23, 1968     S. W. ALDERFER     3,379,236
MOLDED TIRES
Filed Aug. 3, 1965     8 Sheets-Sheet 7

INVENTOR.
STERLING W. ALDERFER
BY Hamilton & Cook
ATTORNEYS

April 23, 1968 S. W. ALDERFER 3,379,236
MOLDED TIRES
Filed Aug. 3, 1965 8 Sheets-Sheet 8

FIG. 19

INVENTOR.
STERLING W. ALDERFER
BY Hamilton & Cook
ATTORNEYS

United States Patent Office 3,379,236
Patented Apr. 23, 1968

3,379,236
MOLDED TIRES
Sterling W. Alderfer, Akron, Ohio, assignor to Sterling Alderfer Company, Akron, Ohio, a corporation of Ohio
Filed Aug. 3, 1965, Ser. No. 476,907
7 Claims. (Cl. 152—344)

ABSTRACT OF THE DISCLOSURE

A pneumatic tire and method for making same. The tire comprises at least two opposed sections molded of elastomeric material. Each section has an annular mounting base at the radially innermost extent thereof and side walls which extend radially outwardly of the mounting base. The radially outer extremity of the side wall terminates in a transverse joinder flange. Serrated interlocking means are provided to join the joinder flanges on two opposed tire sections so that a tread is presented. To mold these tire sections a cavity of generally sickle-shaped cross section is formed in a mold. Reinforcing materials are positioned at selected locations within this sickle-shaped cavity, and the elastomeric material from which the tire is to be made is introduced into the cavity and cured. Two such molded sections are joined to form the tire, the tread section being either separate or integral with one of the sections so molded.

---

The present invention relates generally to tire construction and manufacture. More particularly, the present invention relates to molded pneumatic tires. Specifically, the present invention relates to an inflatable tire formed by the joinder of unique, molded sections.

Pneumatic tires are complex structures developed in the face of countless problems. Many of these problems arise from combining several highly dissimilar materials into an integrally functioning article. The typical pneumatic tire is epitomized by its generally horseshoe-shaped cross section. The majority of the tire consists of a textile, such as cotton, rayon or nylon, fabric intermixed with a vulcanized rubber, or equivalent, compound. Additional wear resistant rubber, or substitutes therefor, form the tread portion which contacts the road, and the radially innermost or bead portion of the tire—that corresponding to the heels of the horseshoe—contains a stranded wire ring, or grommet, for maintaining that portion of the assemblage inextensible.

Such tires are laboriously made by wrapping plies of the rubber coated textile fabric onto a tire building drum with the bead grommet suitably positioned and enclosed by the plies. At this stage the future tire looks like an endless belt and is called a tire band. After removal from the drumlike tire building machine, the tire band must be shaped into its familiar toroidal form and cured.

Not only does this entire process require highly paid skilled labor, expensive machinery and considerable time, but is also subject to numerous dangerous and expensive errors. For example, misplacement of the bead grommet onto the tire building machine results in a tire band which is out-of-round. Tires formed from such bands have bunching of the fabric on one side and overly stretched fabric on the other, each such distortion of the fabric being capable of causing premature tire failure.

Less obvious but equally as deleterious, simply mishandling the tire band after it is formed and prior shaping can cause actual tire failure during service. Permitting the tire band to lie flat, to hang on too slender a support, to be folded, or to be subjected to the weight of an external object constitutes mishandling. Any of these things will cause the bead grommet to kink, and once the bead is kinked there is no feasible way of straightening it. The danger occurs when the kinked bead is cured into the tire.

Even improperly putting the tire band into the shaping and curing press or improperly removing it can cause irreparable damage. And, after the tire has successfully survived the various pitfalls of the necessary manfacturing operations, it is still subject to the hazard of careless mounting onto the rim with which it will be used. Any attempt forcefully to pry or drive the bead over the rim flanges may cause the bead wire to kink or separate from the rubber and fabric with which it is surrounded. Kinking of the bead can result in localizing the stresses to which the bead is subjected and even itself result in separation of the grommet from the fabric. Localization of the stresses eventually crystallizes the wire so that failure may result at that point. Separation may cause failure of the bead by permitting corrosion, but even more dangerous, a bead grommet that has separated from the surrounding fabric will generate sufficient heat to char and completely destroy the fabric.

Tire manufacturers are fully aware of these difficulties and are continually searching for methods and materials to eliminate any, or all, of these drawbacks. One prior known attempt to avoid all these difficulties involved molding the tire in its toroidal shape. This attempt utilized polyurethane, but the experiment failed because polyurethane has the inherent tendency to "grow." The tires so molded did just that. They stretched until the tire was too big for the wheel and wheel well. They eventually outgrew the rim flanges and could not be retained on the wheel and even, in some cases, stretched to the point where they rubbed the fenders on turns.

It is therefore a primary object of the present invention to provide a pneumatic tire which can be molded from an elastomeric material, even polyurethane, so that it will maintain its size within acceptable tolerances.

It is another object of the present invention to provide a tire, as above, which utilizes a bead reinforcement not subject to the deleterious kinking incident to wire grommet bead reinforcement when used with prior art forms.

It is yet another object of the present invention to provide a tire, as above, which can be either tubed or tubeless, sections which are uniquely joined into a toroidal shape quickly and inexpensively.

It is still another object of the present invention to provide a tire, as above, which can be either tube or tubeless.

It is a further object of the present invention to provide a tire, as above, which may be adapted for selective tread interchange.

It is a still further object of the present invention to provide a tire, as above, which may be compactly stored prior to mounting and which is usable under a wide variety of conditions.

It is an even further object of the present invention to provide a tire, as above, which is readily mounted on a standard, flat base or drop center, rim and can also be as readily mounted on a wide base rim.

These and other objects of the invention, as well as the advantages thereof over existing and prior art forms, will be apparent in view of the following detailed description of the attached drawings and are accomplished by means hereinafter described and claimed.

One preferred and two alternative tire constructions, together with the preferred form of the method by which such tires can be made are shown by way of example in the accompanying drawings and hereinafter described in detail without attempting to show all of the various forms and modifications in which the invention might be embodied; the invention being measured by the appended claims and not by the details of the specification.

In general, a tire embodying the concept of the present invention is basically comprised of two molded tire sections which, when paired in either mated or opposed relation, form a tire carcass. Each carcass section is annular with a generally sickle-shaped configuration in cross section and has a radially inner mounting base defining the bead portion for engaging the flange of the rim on which the tire is mounted. A side wall extends radially outwardly from the mounting base and terminates in a generally transverse, axially oriented, joinder flange, which also defines the cushion for carrying the encircling annular tread portion.

A variety of means may be provided for securing the joinder flanges on opposed tire sections to complete the tire. In any event, when so joined the tire assumes the conventional toroidal shape and has the usual tread surface for engagement with the roadway. Such a tire can be manufactured inexpensively and easily from an elastomeric material molded in an annular cavity of the aforementioned generally sickle-shaped cross section. For those materials which do not retain their molded size, inextensible reinforcing cloth is incorporated not only within the mounting base and joinder flange portions of the tire section but also within the tread portion of constructions employing a third, or tread, section. To reinforce the side wall portion, a non-puckering circular knit sleeve may be incorporated therein.

Figure 1:
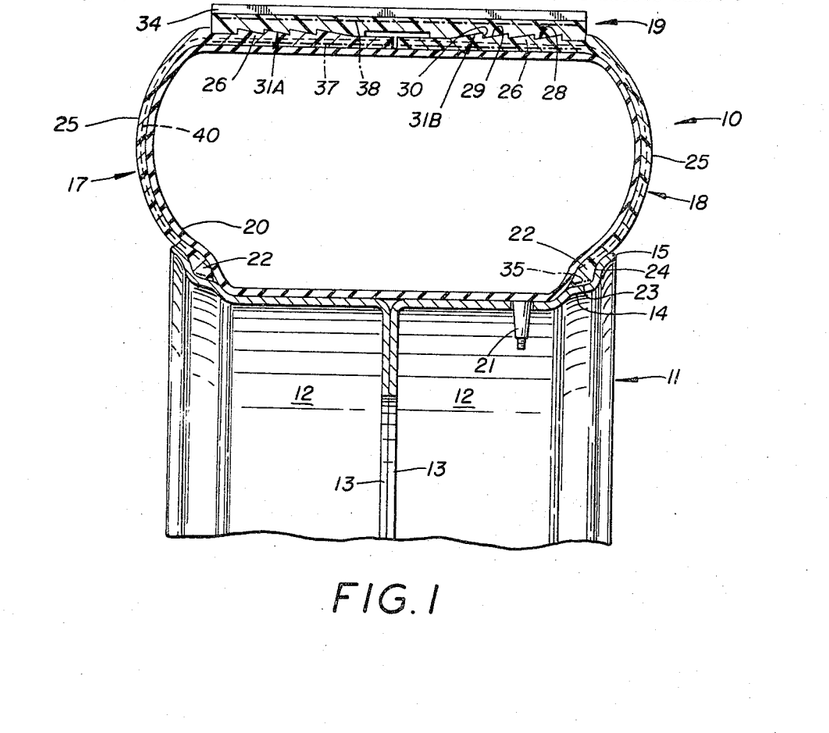
FIG. 1 is a cross section taken through one form of a pneumatic tubed tire constructed according to the concept of the persent invention and a portion of a flat, wide base rim on which it is mounted.

Turning now to the drawings for a more detailed description of the invention, one form of the subject tire is indicated generally by the numeral 10 in FIG. 1 and is depicted mounted on a rim 11. The rim 11 is of the wide base style and is formed from two sections each having a web 12 terminating in a radially inwardly directed flange 13 by which the two sections can be joined together and by which the rim can be mounted on a wheel (not shown). At the opposite end of each web is a radially inclined bead seat 14 terminating in a radially directed bead flange 15. Such a rim is well-known to the art and is frequently used on motorized golf carts, industrial vehicles and the like.

The tire 10, as depicted in FIG. 1, is molded in three interfitting parts—two tire carcass sections 17 and 18 and a tread section 19—and inflated by a tube 20 with the usual valve 21 extending through the web 12 of one of the rim sections. Each tire section has an annular mounting base 22 on the radially inner portion thereof for cooperatively engaging the rim 11. In order to adapt this new tire to existing rim constructions, the mounting base 22 may be provided with a generally axially oriented foot surface 23 to engage the standard bead seat 14, and the outer wall 24 of the mounting base 22 may be formed to engage the standard bead flange 15 for axial retention of the mounting base 22 on the rim 11.

Each tire section 17 and 18 also has a side wall 25 curving radially outwardly and away from the mounting base 22 and terminating in an annular, generally transverse, axially oriented joinder flange 26. In the tire form depicted in FIG. 1 the radially outer surface of each joinder flange 26 is provided with a plurality of circumferential serrations 28. Each serration 28 has an axially inclined lead-in wall 29 and a radially directed stop wall 30 facing the side wall 25. The serrations 28 on the two tire sections 17 and 18 matingly engage corresponding serrations 31 on the radially inner surface 32 of the annular tread section 19.

The serrations 31A on the half of the tread section 19 engaged by the serrations 28 on tire section 17 are oppositely disposed to the serrations 31B on that half of the tread section 19 engaged by the serrations 28 on tire section 18 so that they interact to lock the sections together upon inflation of the tube 20.

The radially outer surface of the tread section 19 may be provided with any desired tread design. As shown, a plurality of circumferentially spaced, axially oriented ribs 34 provide excellent traction on sand and are equally as efficient on grass. Different tread designs may be used as required for different purposes.

The carcass, or tire, sections 17 and 18, as well as the tread sections 19, can be selectively molded from any suitable elastomeric material. For those materials which are dimensionally stable, the sections need only be molded of the material itself and assembled. However, when using a material which is dimensionally unstable in that it "grows," certain reinforcing of the molded sections is required. Referring to FIG. 1, the mounting base 22 incorporates a reinforcing means, or belt of cloth, 35 which, at least circumferentially, must be as inextensible as possible to retain the mounting base 22 on the rim 11. The joinder flange 26 and the tread section 19 also incorporate reinforcing belts 37 and 38, respectively, which provide the dimensional stability necessary to retain the tread portion 19 on the sections 17 and 18 as well as allow for complete interchangeability in the components. In this way, should any component become damaged through severe use it would be necessary to replace only the damaged component and not the entire tire.

Preferably the belt 37 should allow minimum growth laterally, but may allow some growth circumferentially so that the joinder flanges can expand completely into the tread portion 19. The tread portion 19 will then be relied upon to stabilize the circumferential dimension and will therefore require that belt 38 be substantially inextensible circumferentially. Belt 38 will need to be substantially inextensible laterally, as well, in order to impart the strength necessary for the tread section 19 to hold the tire sections 17 and 18 together. However, for ease of manufacture the reinforcing belts 35, 37 and 38 may be of the same material.

It has been found that square weave cloth, preferably of rayon, although such materials as nylon, glass, wire and the like work quite well, is capable of providing the desired strengths. A square weave cloth having a denier and material chosen for the use to which the tire 10 is to be put provides primary strength in directions parallel to both the warp and fill strands. Thus, if the belt 38 of woven fabric is positioned with the warp strands extending annularly around the tread section 19 they supply the requisite circumferential reinforcement and the fill strands supply the desired dimensional stability laterally. The belts 35 and 37 are similarly positioned in the mounting base 22 and the joinder flange 26, respectively.

It should also be noted that the square woven reinforcing cloth should be a loose weave, i.e., an open weave with interstices between the parallel warp strands and the parallel fill strands. Such a weave provides a very high adhesion strength between the cloth and the elastomeric material because the elastomeric material can readily penetrate the interstices between the strands to form an homogenous bond therethrough. For most applications this mechanical bonding of the elastomeric material through the interstices will be sufficient. However, it can well be envisioned that for some applications it may be necessary additionally to roughen the fibers themselves to permit an additional mechanical bonding directly to the fiber. Or, when little or no chemical bonding obtains between the continuous filaments forming the strands of the cloth heretofore described it may also be desirable, for some applications, to treat the cloth woven of continuous filaments with a cement to create a bond between the filaments themselves and the elastomeric material.

For reinforcing the side wall 25, the square woven cloth described above is impractical since it would not conform to the three dimensional shape of the side wall without puckering. Hence, the side wall 25 may be reinforced by a sleeve 40 of circularly knit fabric. The two-way stretch inherent to circularly knit fabric permits it to conform completely to the shape of the side wall 25 merely by stretching and without any puckering. Here too, a mechanical bonding of the sleeve 40 to the elastomeric material is obtained primarily by the elastomeric material which passes through the interstices of the weave, and additional bonding, if necessary, may be obtained by the use of fibrous strands or coating, as described above. It should also be noted that the elastomeric material which extends through the interstices of the knit tends to lock the knit so that the previously two-way stretch fabric is stabilized.

The sleeve 40 may also be square woven in the form of a tube. With this weave the strands longitudinally of the tube would be substantially inextensible and the pick strands—i.e., the strands extending transversely of the longitudinal strands and circumferentially of the tube—would be very elastic. A weave of this type would not only allow the sleeve 40 to conform to the shape of the side wall without puckering, but would also impart lateral inextensibility to the arch portion 26 so that the reinforcing belt 37 could be selectively eliminated.

Figure 2:
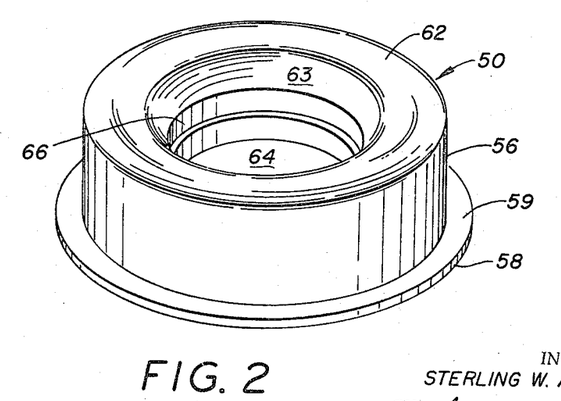
FIG. 2 is a perspective view of the core used to mold a tire section of the tire depicted in FIG. 1.

To make a tire 10, a core 50 conforming to the desired interior surface of the tire section 17 and/or 18 is fabricated to interfit with the mold 51 so as to define a cavity 52 (FIG. 8) of generally sickle-shaped cross section. The cavity 52 thus formed has three areas—a tang portion 53, in which the mounting base 22 will be formed; an arch portion 54, in which the joinder flange 26 will be formed; and, an annular connecting portion 55, in which the side wall 25 will be formed. The core 50 has a face 56 of generally cylindrical configuration which comprises the radially inner boundary of the arch portion 54 of cavity 52. At one end of the face 56 a suitable flange 58 extends radially outwardly. The shoulder surface 59 on flange 58, upon abutment with a similar surface 60 on the mold flange 61 defines the extent to which the core 50 may be inserted into the mold 51. The opposite end of the arch face 56 rounds into the generally radially oriented connecting face 62 which comprises the axially inner boundary of the connecting portion 55 of cavity 52. At the radially innermost extent of the connecting face 62 the core 50 presents a tang face 63 which comprises at least a portion of the radially outermost boundary of the tang portion 53 of cavity 52.

Figure 3:
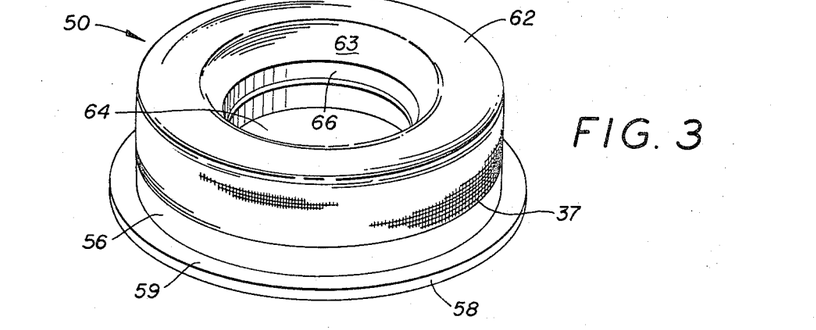
FIG. 3 is a view similar to FIG. 2 with a reinforcing belt of inextensible material positioned thereon.

To reinforce the joinder flange 26 of the tire section an endless belt 37 of substantially inextensible cloth is required in the arch portion 54 of cavity 52. This is conveniently accomplished by encircling the arch face 56 with such a belt 37, as shown in FIG. 3.

Figure 4:
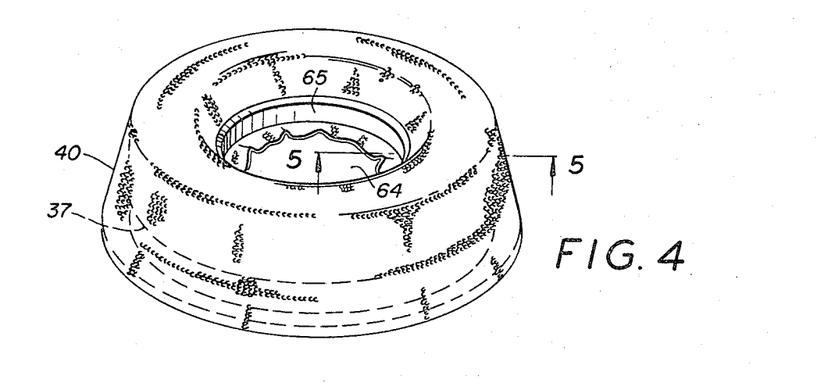
FIG. 4 is a view similar to FIG. 3 with a circularly knit reinforcing sleeve stretched about the core.
Figure 5:
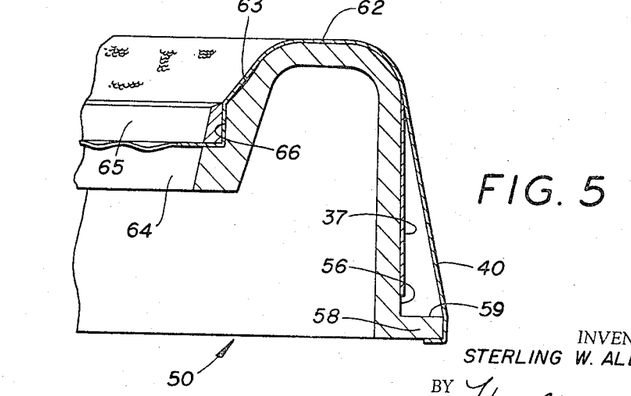
FIG. 5 is an enlarged cross section taken substantially on line 5—5 of FIG. 4.
Figure 6:
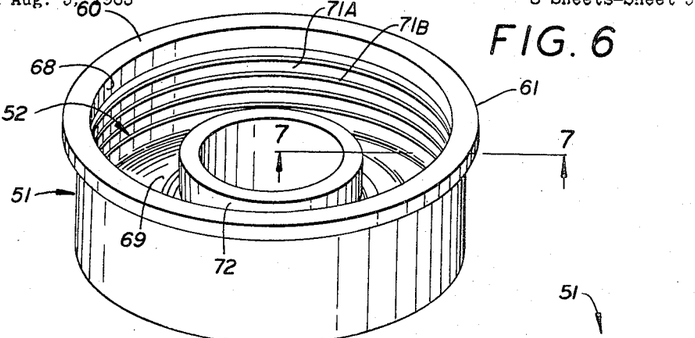
FIG. 6 is a perspective view of the mold used to mold a tire section of the tire depicted in FIG. 1.

Convenience is also served if the sleeve 40 comprising the reinforcement for the side wall 25 is stretched not only through the connecting portion 55 of the cavity 52 but the entire cavity. To do this, one need only hook one end of a length of circularly knit fabric over the core flange 58 and stretch it across the arch face 56, connecting face 62 and tang face 63 to and through the central axial opening 64 in core 50 (FIGS. 4 and 5). A seating ring 65 is removably receivable in a notch 66 extending between the opening 64 and the tang face 63 to pinch the sleeve 40 extending beyond the tank face 63 and thereby maintain it in its stretched position while the core 50 is inserted into the mold 51. A sleeve 40 square woven in the form of a tube, as described above, would be similarly applied.

The mold 51 provides the desired exterior surface for the tire section 17 and/or 18 and has an arch face 68, connecting face 69 and tang face 70 oppositely disposed to the core arch face 56, core connecting face 62 and core tang face 63, respectively, for defining the arch portion 54, connecting portion 55 and tank portion 53 of the cavity 52. As can best be seen in FIGS. 7 and 8, the mold tang face 70 has a generally axially disposed section 70A against which the foot 23 of the mounting base 22 is formed and a generally radially disposed section 70B against which the outer wall 24 of the mounting base 22 is formed.

Figure 7:
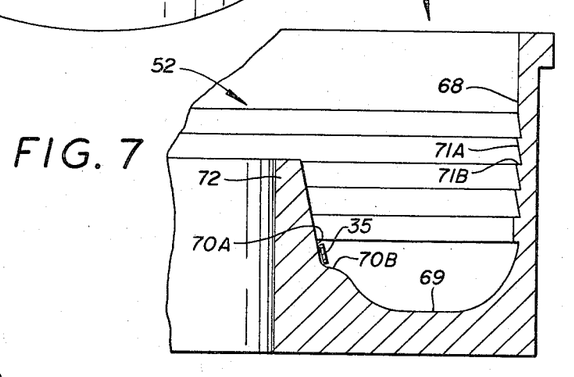
FIG. 7 is an enlarged cross section taken substantially on line 7—7 of FIG. 6.
Figure 8:
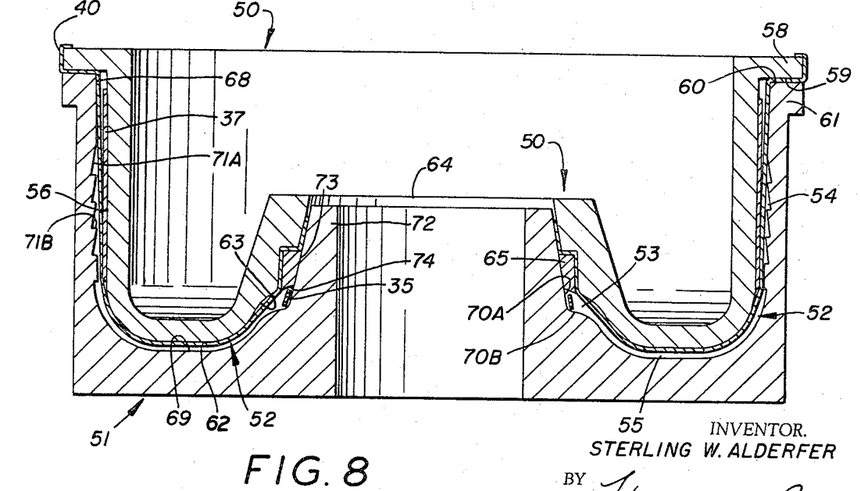
FIG. 8 is a cross section taken diametrically through th eassembled mold and core to show the mold cavity for forming the tire section in cross section with the inextensible cloth and sleeve reinforcing means positioned therein.

The mold connecting face 69 curves radially outwardly and away from the mold tang face 70 and provides the desired outer surface for the side wall 25. The mold connecting face 69 terminates in the axially oriented mold arch face 68 which presents a plurality of annular grooves 71 by which the serrations 28 on the arch portion 26 of the tire sections are formed. The axially inclined surface 71A of the groove forms the lead-in wall 29 and the radially directed surface 71B forms the stop wall 30.

The reinforcing belt 35 may conveniently be positioned within the tang portion 53 of the cavity 52 by placing it around the annular mold tang face 70, as shown in FIG. 7, before the core 50 is inserted into the mold 51. Then, when the core is inserted into the mold, as shown in FIG. 8, the inextensible reinforcing belt 35 will be positioned in the tang portion 53 of the cavity 52, the inextensible reinforcing belt 37 will be positioned in the arch portion 54 and the circularly knit sleeve 40 will be stretched across at least the connecting portion 55. As noted above, the abutting surfaces 59 and 60 on flanges 58 and 61 control the extent to which the core 50 may enter the mold 51. Lateral positioning of the core 50 within the mold 51 may be secured by engagement of the central axially directed hub portion 72 of the mold 51 with the central opening 64 through the core 50. As shown, ease of joinder is accomplished by utilizing a slightly conical taper on the hub portion 72 and mating opening 64. The radially inner surface 73 of the seating ring 65 is similarly tapered to provide an engagement between the ring 65 and the hub portion 72 sufficient to retain the elastomeric material within the cavity 52 until it sets, or cures.

The beveled face 74 on ring 65 forms a continuation of the core tang face 63 and bounds therewith the radially outer side of the tang portion 53 of the cavity 52 in which the mounting base 22 is formed.

Figure 9:
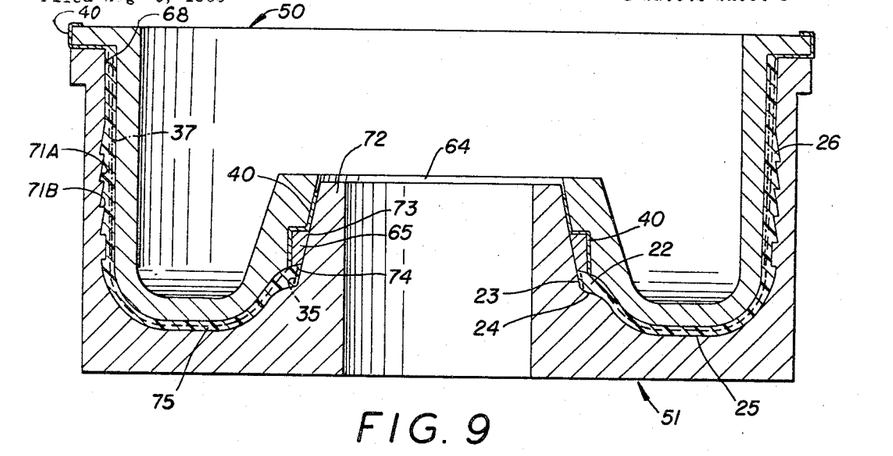
FIG. 9 is a view similar to FIG. 8 depicting the tire section molded.

The cavity 52 may be charged with elastomeric material 75, as shown in FIG. 9, in any desired fashion.

It has been found that a satisfactory elastomeric material would be a urethane elastomer. These are produced through the reaction of certain polyisocyanates and polyhydroxy compounds to form a long chain, essentially linear macromolecules which are conventionally chain extended and cross linked to complete the reaction. Such conventional urethane elastomers are generally prepared by casting techniques in which polyesters and/or polyethers, polyisocyanates and chain extenders are mixed together in liquid state at elevated, or room, temperatures and poured into molds. After a period of solidification the molds may be opened and the solid elastomer removed. Complete curing of the "green" elastomer may be accomplished by leaving it in the mold for a period of time beyond that required to solidify, or the green elastomer may be removed and cured by circulating hot air around it.

Plasticizers may be added to increase the flexibility and reduce hardness. Similarly, pigments may be added, as desired, for color control.

Urethane elastomers offer high tensile strength and have outstanding abrasion, cut and tear resistance; excellent solvent resistance, particularly to gasoline; low air permeability; exceptionally low temperature flexibility; and, resistance to aliphatic hydrocarbons.

Figure 10:
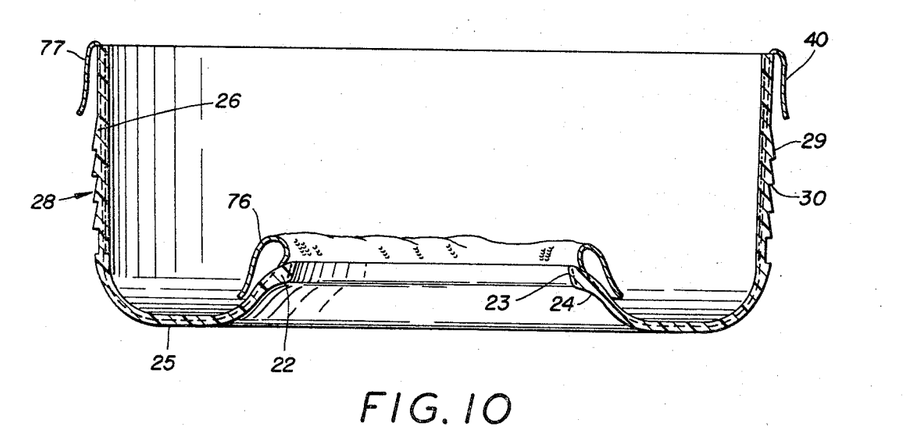
FIG. 10 is a cross section through a molded tire section after it has been removed from the mold.

After the elastomeric material 75 has set, or cured, the mold 51 and core 50 are separated and a molded tire section 17 or 18 is removed. Upon removal, the tire section has the sickle-shaped cross section depicted in FIG. 10 with the excess, or selvage, sections 76 and 77 of the sleeve 40 extending outwardly of the mounting base 22 and arch portion 26, respectively, thereof. The excess sections 76 and 77 are preferably removed prior to assembly as a tire.

A tire such as that depicted in FIG. 1 also requires a tread section 19. The tread section 19 being merely a hoop-like band it may readily be molded in a tread mold 80 and tread core 81 as shown in FIGS. 11–14. For the particular tread design depicted on the tire 10 the cylindrical mold 80 has a plurality of circumferentially spaced, longitudinal grooves 82 on the radially inner surface 83 thereof. The grooves 82 extend axially downwardly from the top 84 of the tread mold 80 and terminate in spaced relation above the base surface 85.

Figure 11:
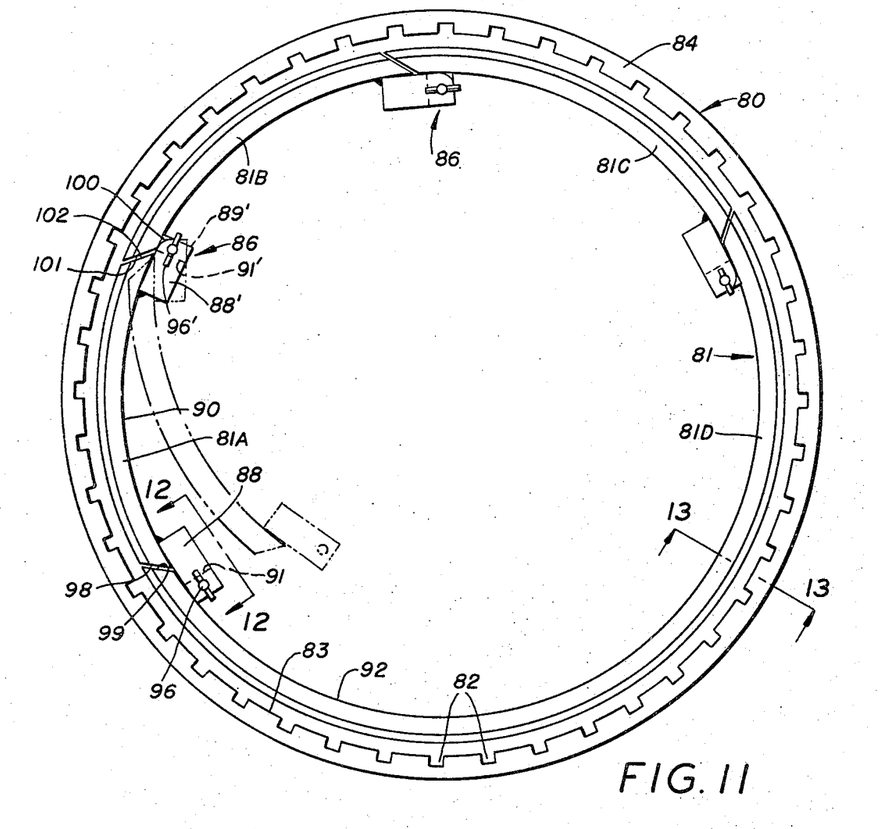
FIG. 11 is a top plan of an assembled mold and core used to form the tread section of the tire depicted in FIG. 1.
Figure 12:
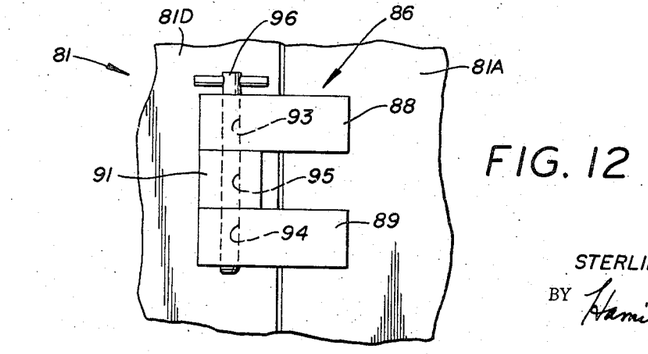
FIG. 12 is an enlarged elevation taken substantially on line 12—12 of FIG. 11 depicting the separable hinge for the tread forming core.

The core 81 is cooperatively positioned interiorly of the mold 80 and is collapsible for ease of removal after the tread portion 19 has been molded. As shown, the tread core 81 may comprise a plurality of arcuate portions 81A, 81B, 81C and 81D suitably hinged to fold radially inwardly to a collapsed position. Each of the hinges 86 may be substantially the same and for that reason only the one between arcuate portions 81A and 81D will be described in detail. Hinge 86 comprises a pair of spaced apart, parallel brackets 88 and 89 attached to and extending circumferentially beyond the radially inner side 90 of the arcuate core portion 81A. Brackets 88 and 89 embrace a radially inwardly extending lug 91 attached to the radially inner surface 92 of the arcuate core portion 81D. The brackets 88 and 89 together with the lug 91 have registered bores 93, 94 and 95, respectively, for receiving a pin 96 at least when the core 81 is in expanded annular position within the mold 80.

At the joint where the arcuate portions separate to effect the collapse of the core 81, for example, between portions 81A and 81D, the adjoining ends 98 and 99 of portion 81A and 81D, respectively, are radially inclined toward the lug 91 to permit the portion 81A to rotate away from the portion 81D without any binding restriction. Then too, the pin 96 of that joint must be removable.

To prevent binding at the remainder of the joints the radially outer corner of the bracket extending beyond the arcuate core portion to which it is attached must be rounded, and the radial inclination of the opposed edges of the core portions should be reversed. For example, referring to the joint between arcuate portions 81A and 81B, the radially outer corners 100 on brackets 88' and 89' must be rounded and the adjoining ends 101 and 102 are radially inclined toward the brackets 88' and 89' rather than the lug 91'. The pin 96' in this type joint need not be removable.

Figure 13:
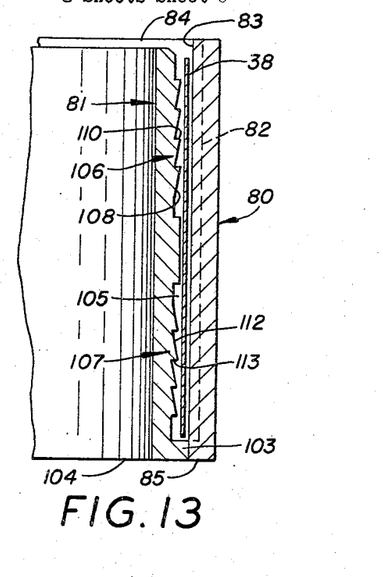
FIG. 13 is a cross section taken substantially on line 13—13 of FIG. 11 to show the mold cavity for forming the tread section in cross section and with an inextensible reinforcing cloth positioned therein.

The radially outer side of the core 81 has a radially extending peripheral shoulder 103, adjacent the base surface 104, which engages the radially inner surface 83 of the mold 80 to space the core 81 a proper distance inwardly of the mold 80 and retain the molding material within the cavity 105 formed between the mold and core.

Upwardly of the shoulder 103 the outer side of the core 81 is divided into an upper zone 106 and a lower zone 107. The upper zone 106 has a plurality of annular indentations of angular cross section chased therein to form the serrations 31A on the radially inner surface 32 of the tread section 19. The axially inclined sides 108 of the indentations form the lead-in walls 109 and the radially directed sides 110 form the stop walls 111 which mate with the corresponding lead-in walls 29 and stop walls 30 on the arch portion 26 of the tire section 17.

The lower zone 107 is provided with a plurality of similar annular indentations to form the serrations 31B on tread section 19. Hence, the axially inclined surfaces 112 and the radially directed surfaces 113 are oppositely disposed. As can be seen in FIG. 13, the radial surfaces 110 and 113 are faced axially away from each other so that the stop walls 111 and 114, respectively, formed thereby will be forced into mating engagement with the respective stop walls 30 on the opposed tire sections 17 and 18 when the tire 10 is inflated.

Figure 14:
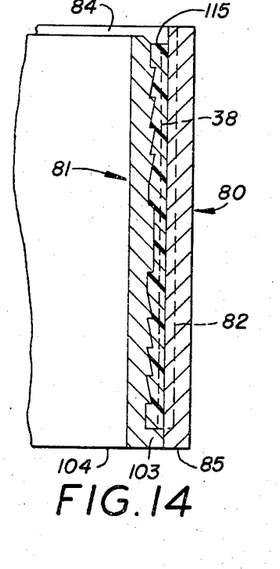
FIG. 14 is a view similar to FIG. 13 depicting the tread section molded.
Figure 15:
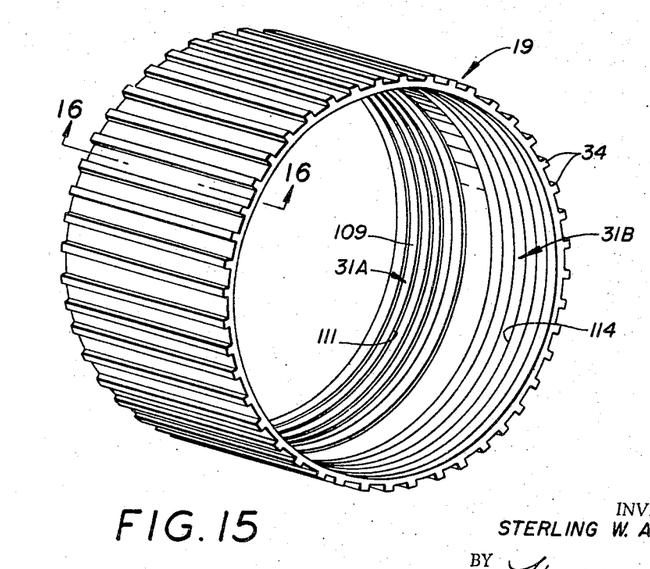
FIG. 15 is a perspective view of the molded tread section after it has been removed from the mold.
Figure 16:
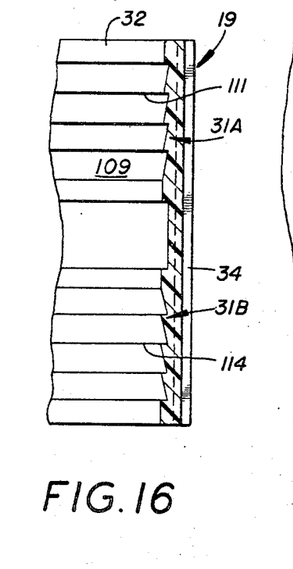
FIG. 16 is a cross section taken substantially on line 16—16 of FIG. 15.

With the tread mold 80 and core 81 interfitted, as shown in FIG. 13, the inextensible annular reinforcing cloth belt 38 is positioned in the cavity 105 therebetween and a charge of elastomeric material 115 is introduced into the cavity 105, as depicted in FIG. 14. With such a mold and core construction the elastomeric material can simply be poured into the open top of the cavity 105.

After the elastomeric material has set, or cured, the pin 96 is removed, the core 81 is collapsed and extracted from the mold 80 and the molded tread section is removed.

Figure 17:
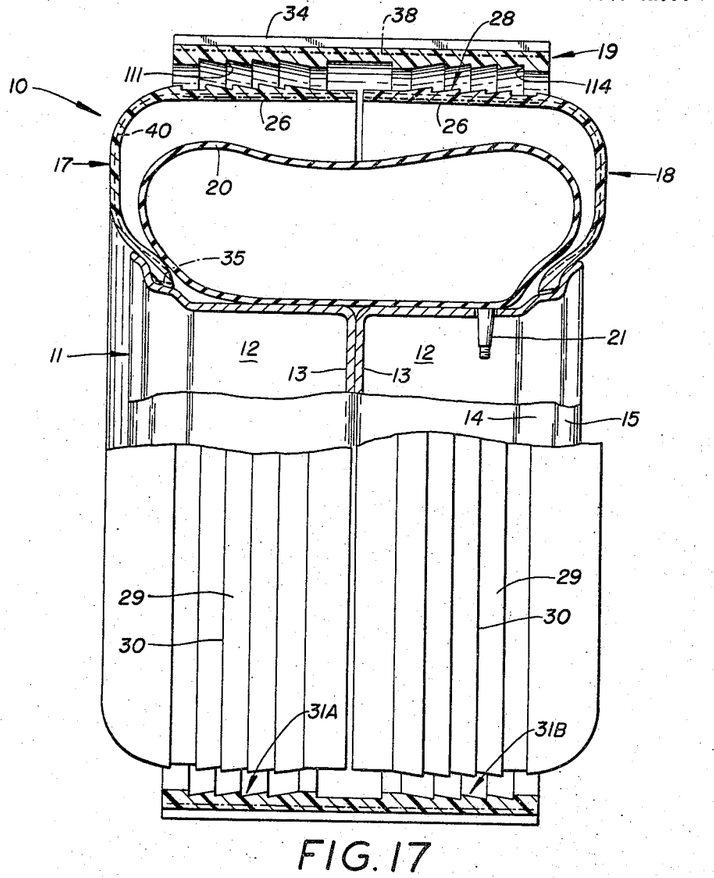
FIG. 17 is a formal elevation, partly in section and partly broken away, depicting two opposing tire sections and a tread section interfitted prior tubed inflation.

Two tire sections 17 and 18, as molded in the mold 51 and core 50, a tread section 19, as molded in the mold 80 and core 81, a tube 20 and a rim 11 are assembled, as depicted in FIG. 17, and the tube 20 inflated through valve 21 to complete the tire 10. The pneumatic pressure extends the arches 26 of the tire sections 17 and 18 outwardly into locking engagement with the tread section 19, and, as a result of the mating of serrations 31A on tread section 19 with serrations 28 on tire section 17 and of serrations 31B on tire section 19 with serrations 28 on tire section 18 the components of the tire are held together.

In such a construction not only may the components be individually replaced, but equally as important, the characteristics of the components may be customized for the particular use intended, i.e., the tire sections 17 and 18 may be made more or less flexible depending upon the ride characteristics desired, and the tread section 19 may be manufactured to a selective hardness depending upon the frictional and wear characteristics desired.

Figure 18:
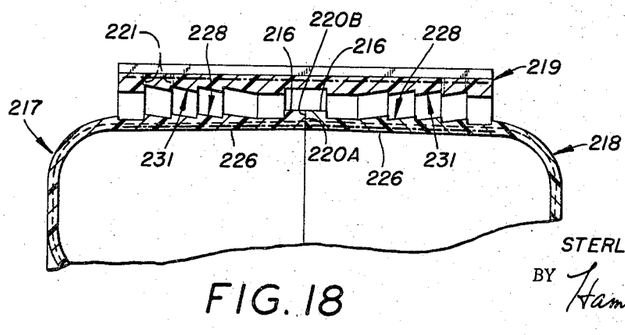
FIG. 18 is a partial cross section depicting one form of joining two tire sections for tubless inflation.

Moreover, such a tire may be made tubeless simply by sealingly joining the opposed arch ends of the tire sections. As shown in FIG. 18, the ends of the arch portion 226 of each of the tire sections 217 and 218 terminate in a head 216. The contiguous surfaces 220A and 220B on the heads 216 may be sealed together by an adhesive means, electronic seal or any other means compatible with the particular elastomeric material being used. With the tire sections 217 and 218 thus joined no tube is required and the sections themselves may be mounted on a suitable rim (not shown) and inflated.

While it may be suitable for some uses to provide the radially outer surface of the arches 226 on tire sections 217 and 218 with a tread design, many applications will be more satisfactorily served by employing a separable tread section 219 retained on the joined tire sections 217 and 218 by interfitting serrations 228 and 231 similar to those utilized in conjunction with the tire 10. Furthermore, with such a construction the connection between the tread section 219 and tire sections 217 and 218 relieves the stress imparted to the joinder of the heads 216.

It should also be apparent that by attaching the tread section 219 to the tire sections 217 and 218 simply through the interfitting of the serrations 228 and 231, the tread section 219 may be readily replaceable if worn or damaged. However, for some purposes it may be desirable to affix the tread section permanently. It has been found that when the tread section 219 is permanently attached to the tire sections 217 and 218, as by adhesive means, vents 221 should be provided radially through the tread section 219 to permit escape of the air entrapped within the serrations. Naturally, the most advantageous location for the vents 221 is at the radially outermost extent of the serrations 231, as shown in phantom in FIG. 18.

A further modification of the present invention comprises a two-piece molded tire 310. In view of the very detailed disclosure set forth above, a perusal of FIG. 19 readily reveals that for such a construction the two tire sections 317 and 318 are not identical, as in the other modifications described. Accordingly, they are not formed in the same mold. However, upon gaining an understanding of the preferred construction for tire 310 the changes to be effected for a second mold and core will be readily apparent.

Figure 19:
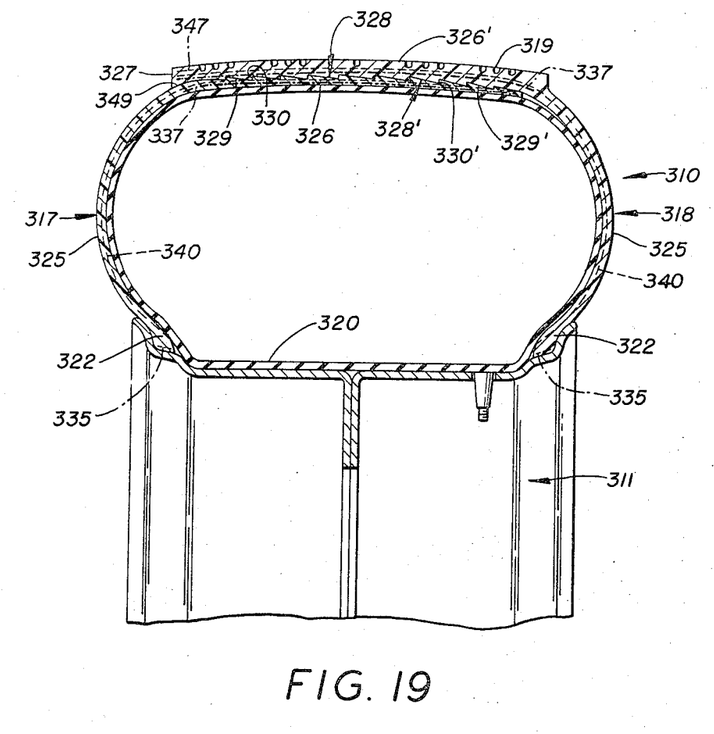
FIG. 19 is a view similar to FIG. 1 depicting an alternate embodiment of a tire molded according to the concept of the present invention in two pieces.

Tire section 317, as in its counterpart tire 10, has a mounting base 322 from which a side wall 325 curves radially outwardly to trminate in an axially oriented arch portion 326. The radially outer surface of the arch portion 326 is provided with a plurality of parallel, circumferential serrations 328 having an axially inclined lead-in wall 329 and a radially directed stop wall 330 which faces the side wall 325.

Tire section 318 also has a mounting base 322 at the radially inner extent thereof from which a side wall 325 extends radially outwardly. However, the arch portion 326' extending axially from the radially outwardly terminus of the side wall portion 325 is decidedly different from the arch portion 326 on tire section 317.

On the radially inner side of the arch portion 326' are a plurality of parallel, annular serrations 328' also having an axially inclined lead-in wall 329' and a radially directed stop wall 330' which faces the side wall 325 of tire section 318. As such, the serrations 328' on tire sections 318 are oppositely disposed to the serrations 328 on tire section 317 and are matingly engageable therewith.

On the radially outer side of the arch portion 326' a suitable tread 319 is incorporated having the thickness desired.

Arch portions 326 and 326' both include circumferentially and axially inextensible reinforcing belts 337. Similarly too, the mounting bases 322 have circumferentially inextensible reinforcing belts 335 and the side walls 325 may have reinforcing sleeves 340. In addition to the reinforcing means similar to those utilized with tire 10, the two-piece tire 310 may require further reinforcing stabilization at the tip 327 of the arch 326' to counteract the centrifugal forces to which it will be subject. For that reason the tip 327 of the tire 310 depicted in FIG. 19 has an additional reinforcing belt 347 molded therein. The belt 347 may be made of the inextensible cloth from which the belts 335 are fabricated, but here too different uses may dictate differing reinforcement.

Another satisfactory mode of reinforcing the tire 310 can utilize the sleeve 40 square woven in the form of a tube with the strands longitudinally of the tube being substantially inextensible and the pick strands transversely thereof being elastic, as described earlier. With the substantially inextensible strands extending radially of the tire the belt 337 could be eliminated from tire section 317 and belt 337 in tire section 318 would be of circumferentially inextensible cloth to stabilize the outer diameter of th tire 310.

So long as the two sections 317 and 318 remain separable a tube 320 is preferred, the inflation of which on rim 311 forces the serrations 328 and 328' into locking engagement to complete the tire 310. Of course, if the arch portions 326 and 326' are sealingly joined, as by applying an adhsive means 349 between arches 326 and 326', a tubeless tire would be provided.

It should therefore be apparent that a pneumatic tire, according to the above-described concept, can be readily and inexpensively molded from elastomeric material and assembled without the drawbacks incident to prior known constructions. And further, that the other objects of the invention are also fully accomplished.

I claim:

1. A pneumatic tire comprising, a pair of opposed molded tire sections, each tire section having a generally sickle-shaped cross section with a radially inner annular mounting base, a side wall extending radially outwardly of said mounting base, a joinder flange radially outwardly of said mounting base oriented axially from said side wall and terminating in a circumferential tip portion, the tip portions on the joinder flanges of opposed tire sections being secured together, said mounting base incorporating a nonextensible reinforcing means and at least said side wall incorporating a circularly knit sleeve, an annular tread section being attached to said tire section by a plurality of annular serrations on the radially inner side of said tread section matingly engaging corresponding annular serrations on the radially outer surface of said secured joinder flanges, said tread section incorporating a nonextensible reinforcing means.

2. A pneumatic tire, as set forth in claim 1, in which the annular serrations on each tire section are angular in cross section and have an axially inclined lead-in wall and a radially directed stop wall which faces the side wall of the tire section having said serrations and the serrations on said tread section are oppositely directed for mating engagement with the serrations on said tire sections.

3. A pneumatic tire, as set forth in claim 2, in which an adhesive means is employed between the serrations on said tread section and the serrations on said joinder flanges and vents extend between the serrations on the radially inner surface of the tread section and the radially outer surface thereof to exit the air between the tread section and the joinder flanges on assembly of the tire.

4. A pneumatic tire comprising, at least two, molded urethane elastomer tire sections having a generally sickle-shaped cross section, each said elastomeric section having a radially inner, annular mounting base, a radially extending side wall and a radially outer, generally transverse, annular joinder flange, a knit, tubular cloth reinforcing sleeve extensible in radial and circumferential directions with respect to the tire section received from said mounting base, through said side wall and into the joinder flange of said elastomeric tire sections, said knit sleeve material having interstices, the elastomeric material penetrating said interstices to stabilize said sleeve, and means for joining the radially outer flanges of said elastomeric sections into a tire.

5. A pneumatic tire, as set forth in claim 4, in which a separable tread section is attached to the joinder flanges of said two elastomeric tire sections by a plurality of annular serrations on the radially inner side of said tread section matingly engaging corresponding annular serrations formed on the radially outer surface of said joinder flanges.

6. A pneumatic tire, as set forth in claim 5, in which the knit sleeve extends through said joinder flange as well as said said wall and a circumferentially inextensible reinforcing belt means is received in the mounting base of each said molded tire section.

7. A pneumatic tire comprising, at least two, molded urethane elastomer tire sections having a generally sickle shaped cross section, each said elastomeric section having a radially inner, annular mounting base, a radially extending side wall and a radially outer, generally transverse, annular joinder flange, annular serrations on the radially outer side of the joinder flange on each said tire section, a knit tubular cloth reinforcing sleeve extensible in at least one direction received from said mounting base, through said side wall and into the joinder flange of said elastomeric tire sections, said knit sleeve material having interstices, elastomeric material penetrating said interstices to stabilize said sleeve, an annular tread section, a plurality of annular serrations on the radially inner side of said tread section, the serrations on said tread section matingly engaging the corresponding serrations on said tire section.

References Cited

UNITED STATES PATENTS

| 1,354,392 | 9/1920 | Greene | 152—344 X |
| 2,742,943 | 4/1956 | Tenkins et al. | 152—344 |
| 2,902,072 | 9/1959 | Reuter | 152—313 X |
| 1,063,196 | 6/1913 | Maas | 152—358 |
| 2,035,660 | 3/1936 | Lippitt | 18—45 |
| 3,044,519 | 7/1962 | Wright | 152—187 |

FOREIGN PATENTS

| 1,613 | 1893 | Great Britain. |
| 5,314 | 4/1904 | Great Britain. |

ARTHUR L. LA POINT, *Primary Examiner.*

Y. P. SCHAEVITZ, *Assistant Examiner.*

UNITED STATES PATENT OFFICE
CERTIFICATE OF CORRECTION

Patent No. 3,379,236                      April 23, 1968

Sterling W. Alderfer

It is certified that error appears in the above identified patent and that said Letters Patent are hereby corrected as shown below:

Column 2, line 42, "which can be either tubed or tubeless," should read -- formed from two or more molded --; line 46, "tube" should read -- tubed --. Column 3, line 17, "th eassemble" should read -- the assembled --; line 40, "formal" should read -- frontal --. Column 6, line 75, cancel "the", secor occurrence. Column 7, line 3, "containuation" should read -- continuation --. Column 10, line 12, "th" should read -- the --. Column 11, line 6, "said", second occurrence, should read -- side --. Column 12, line 8, "Tenkins et al" should read -- Jenkins et al --.

Signed and sealed this 10th day of February 1970.

(SEAL)

Attest:

Edward M. Fletcher, Jr.                WILLIAM E. SCHUYLER, JR.

Attesting Officer                          Commissioner of Patents